US009628837B2

(12) United States Patent
Davidson et al.

(10) Patent No.: US 9,628,837 B2
(45) Date of Patent: Apr. 18, 2017

(54) SYSTEMS AND METHODS FOR PROVIDING SYNCHRONIZED CONTENT

(71) Applicant: AudioStreamTV Inc., New York, NY (US)

(72) Inventors: Yaniv Davidson, New York, NY (US); Adi Gabber, Tel-Aviv (IL)

(73) Assignee: AudioStreamTV Inc., New York, NY (US)

( * ) Notice: Subject to any disclaimer, the term of this patent is extended or adjusted under 35 U.S.C. 154(b) by 270 days.

(21) Appl. No.: 14/454,094

(22) Filed: Aug. 7, 2014

(65) Prior Publication Data

US 2015/0046953 A1     Feb. 12, 2015

Related U.S. Application Data

(60) Provisional application No. 61/863,238, filed on Aug. 7, 2013.

(51) Int. Cl.
| H04N 21/24 | (2011.01) |
|---|---|
| H04N 21/242 | (2011.01) |
| H04N 21/222 | (2011.01) |
| H04N 21/233 | (2011.01) |
| H04N 21/414 | (2011.01) |
| H04N 21/43 | (2011.01) |
| H04N 21/41 | (2011.01) |

(Continued)

(52) U.S. Cl.
CPC ....... *H04N 21/242* (2013.01); *G06K 9/00758* (2013.01); *H04N 21/222* (2013.01); *H04N 21/233* (2013.01); *H04N 21/4122* (2013.01); *H04N 21/41407* (2013.01); *H04N 21/41415* (2013.01); *H04N 21/4223* (2013.01); *H04N 21/4302* (2013.01); *H04N 21/4394* (2013.01); *H04N 21/44008* (2013.01); *H04N 21/8547* (2013.01)

(58) Field of Classification Search
None
See application file for complete search history.

(56) References Cited

U.S. PATENT DOCUMENTS

| 7,046,731 B2 | 5/2006 | Wu et al. |
|---|---|---|
| 7,940,985 B2 | 5/2011 | Sun et al. |

(Continued)

FOREIGN PATENT DOCUMENTS

| EP | 2419861 A1 | 2/2012 |
|---|---|---|
| WO | WO2007/120337 A2 | 10/2007 |
| WO | WO 2015/021251 | 2/2015 |

OTHER PUBLICATIONS

International Search Report Application No. PCT/US2014/50102, Date of Mailing Nov. 6, 2014.

(Continued)

*Primary Examiner* — Cai Chen

(57) ABSTRACT

Systems and methods for providing synchronized content are disclosed. The synchronized content may be content related to visual content captured by an imager of a mobile computing device. The mobile computer device may send the captured visual content to a content synchronization server that may identify the captured visual content, find relevant content associated with the captured visual content, synchronize the relevant content with the captured visual content, and send the synchronized relevant content to the client device.

20 Claims, 10 Drawing Sheets

(51) Int. Cl.
    *H04N 21/4223*    (2011.01)
    *H04N 21/439*     (2011.01)
    *H04N 21/44*      (2011.01)
    *H04N 21/8547*    (2011.01)
    *G06K 9/00*       (2006.01)

(56) References Cited

U.S. PATENT DOCUMENTS

| | | | |
|---|---|---|---|
| 7,983,340 | B2 | 7/2011 | Zhang et al. |
| 8,036,263 | B2* | 10/2011 | Wang ............... G06F 17/30802 348/218.1 |
| 2001/0001160 | A1* | 5/2001 | Shoff ................. H04N 5/44543 725/51 |
| 2008/0082510 | A1* | 4/2008 | Wang ..................... H04H 60/37 |
| 2008/0282019 | A1* | 11/2008 | Lincoln .................. H04H 60/39 711/3 |
| 2010/0225811 | A1 | 9/2010 | Konvisser |
| 2011/0311144 | A1 | 12/2011 | Tardif |
| 2012/0308032 | A1 | 12/2012 | Ginn et al. |
| 2012/0308033 | A1 | 12/2012 | Ginn et al. |
| 2012/0308035 | A1 | 12/2012 | Ginn et al. |
| 2012/0309366 | A1 | 12/2012 | Ginn et al. |
| 2012/0311642 | A1 | 12/2012 | Ginn et al. |
| 2012/0317241 | A1 | 12/2012 | Wang |
| 2013/0177286 | A1* | 7/2013 | Miazzo .................... H04N 9/87 386/201 |
| 2013/0311144 | A1* | 11/2013 | Meiners ............. G06F 17/5004 703/1 |

OTHER PUBLICATIONS

International Preliminary Report on Patentability Dated Feb. 9, 2016 From the International Bureau of WIPO Re. Application No. PCT/US2014/050102.

International Search Report and the Written Opinion Dated Nov. 6, 2014 From the International Searching Authority Re. Application No. PCT/US2014/050102.

Boris Epshtein et al., Detecting Text in Natural Scenes with Stroke Width Transform, Microsoft Corporation, pp. 1-8, http://www.math.tau.ac.il/~turkel/imagepapers/text_detection.pdf.

Vasileios Chasanis et al., Video Rushes Summarization Using Spectral Clustering and Sequence Alignment, Department of Science, University of Ioannina, Oct. 31, 2008, Vancouver, British Columbia, Canada, pp. 75-79, http://users.cs.uoi.gr/~vchasani/files/video_rushes.pdf.

Saddam Bekhet et al., Video Matching Using DC-Image and Local Features, Proceedings of the World Congress on Engineering, 2013, vol. III, London, UK, WCE 2013 (6 pages), http://www.iaeng.org/publication/WCE2013/WCE2013_pp2209-2214.pdf.

Fei Ye et al., Real-time TV Logo Detection based on Color and HOG Features, Institute of Image Communication and Information Processing, Shanghai Jiao Tong University, Shanghai 200240, China, 5 pages.

Ming-Ming Cheng, et al., Global Contrast based Salient Region Detection, Lehigh University, 8 pages, http://vecg.cs.ucl.ac.uk/Projects/SmartGeometry/contrast_saliency/paper_docs/contrast_saliency_small_cvpr11.pdf.

Detect rectangular using Hough Transform—OpenCV Q&A Form, Aug. 7, 2014, 2 pages, http://answers.opencv.org/question/23610/detect-rectangular-using-hough-transform.

Face Detection using Haar Cascades—OpenCV 3.0.0-dev documentation, OpenCV-Python Tutorials, Objection Detection, Aug. 7, 2014, 5 pages, http://docs.opencv.org/trunk/doc/py_tutorials/py_objdetect/py_face_detection/py_face_detection.html.

David G. Lowe, Object Recognition from Local Scale-Invariant Features, Computer Science Department, University of British Columbia, Proc. of the International Conference on Computer Vision, Corfu, Sep. 1999, 8 pages, http://www.cs.ubc.ca/~lowe/papers/iccv99.pdf.

Tie Liu, Learning to Detect a Salient Object, Xi'an Jiaotong University, P.R. China, Microsoft Research Asia, Beijing, P.R. China, 8 pages, http://research.microsoft.com/en-us/um/people/jiansun/papers/salientdetection_cvpr07.pdf.

Communication Pursuant to Rule 164(1) EPC [Supplementary Partial European Search Report.] Dated Feb. 13, 2017 From the European Patent Office Re. Application No. 14834848.5. (7 Pages).

* cited by examiner

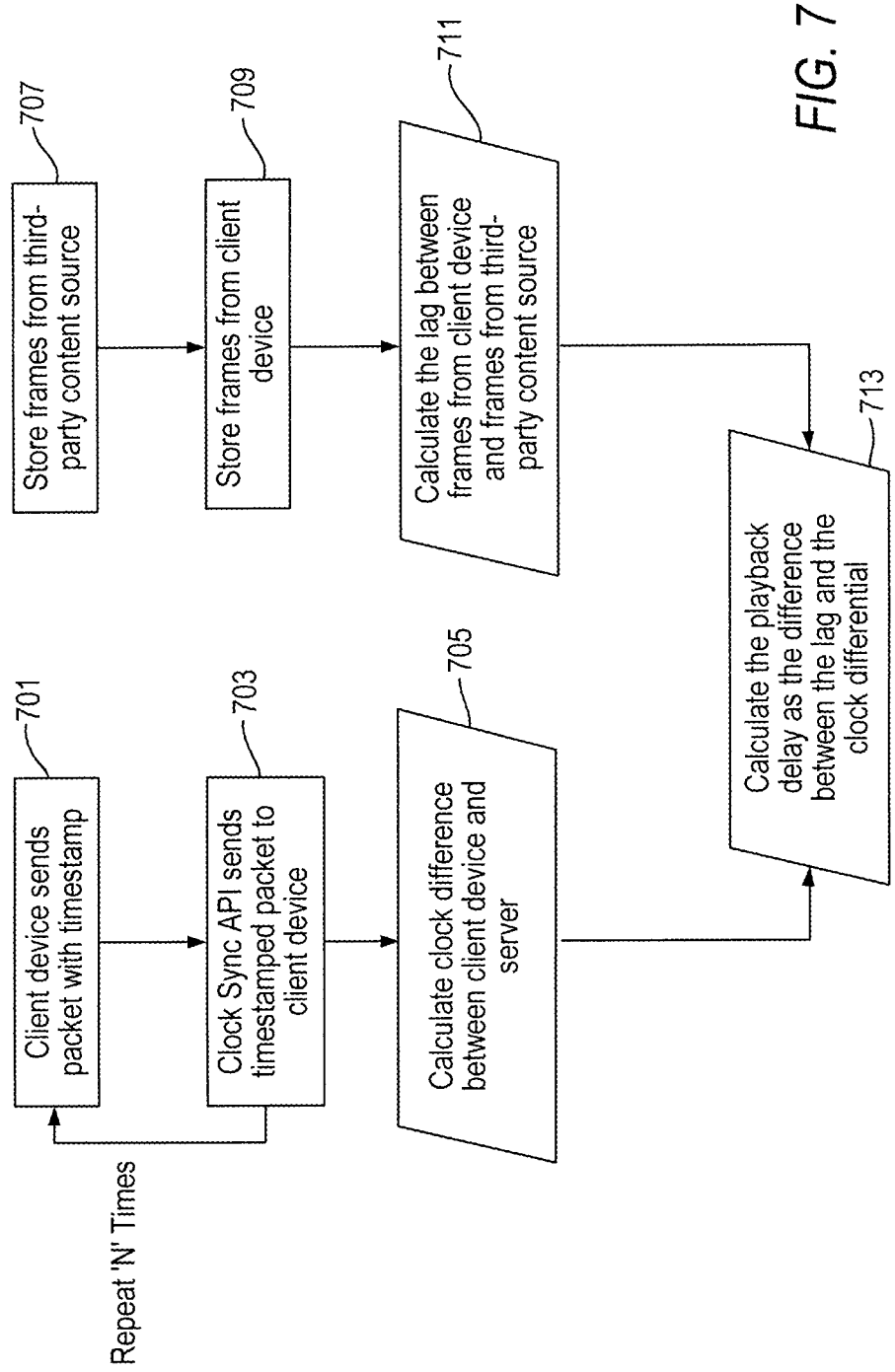

SYSTEMS AND METHODS FOR PROVIDING SYNCHRONIZED CONTENT

CROSS-REFERENCE TO RELATED APPLICATIONS

This application claims the benefit of U.S. Provisional Patent Application No. 61/863,238, filed Aug. 7, 2013, the disclosure of which is incorporated by reference herein in its entirety.

FIELD OF THE INVENTION

The invention relates generally to systems and methods for providing synchronized content.

BACKGROUND

The advance of mobile computing has resulted in unprecedented levels of access to information. A significant number of people use mobile computing devices on a daily basis to communicate with others, navigate the physical world, conduct business, and access information, as well as to provide entertainment and personal assistance. While mobile computing devices tend to be deliberately compact to promote portability, the relatively small display sizes on these devices may diminish the user experience in a number of ways. For instance, it is notoriously more difficult to provide user input to mobile computing devices using tiny keypads and touch-sensitive displays than it is to provide user input to a desktop computing device using a full-sized keyboard and mouse.

Small displays can also diminish the viewing experience for a user who wishes to use the mobile computing device to watch content, such as television, movies, and video clips, for example. On the other hand, large display devices in public places enable a rich visual experience but are often muted to avoid disturbing those who are not interested in listening to the displayed content. Such displays may also be muted if there are several displays in the same location providing different content. Large displays in public spaces may use closed captioning or subtitling to give users a visual rendering that represents a transcription, verbatim or edited, of the audio portion of content being shown on the display. Closed captions, however, are visually distracting and fail to provide the user with a fully satisfying experience as rich auditory features, such as music and voice inflection cannot be satisfactorily rendered via text.

SUMMARY

Systems and methods are disclosed for providing synchronized content that may combine the advantages of mobile computing devices and relatively larger digital displays. The disclosed embodiments may facilitate recognition of visual content being presented on a digital display and provision of synchronized audio, or other content related to the visual content, to a mobile computing device. The mobile computing device, referred to herein as a "client device" may, therefore, enable users to listen to audio that matches and is synchronized with video content presented on a digital display, such as a television, a digital sight, or other media display, even when that display is muted or its audio signal is inaudible to the user. Additional content related to the video content, such as live-blogs, social media posts, and advertisements, for example, may additionally or alternatively be provided to the client device.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 7 shows a flowchart of an exemplary process for providing synchronized content, in accordance with some embodiments.

DETAILED DESCRIPTION

The various embodiments disclosed herein may facilitate the provision of content synchronized with a content source to an Internet connected client device. For example, the a content synchronization server may identify video content screened on a digital display physically close to the client device (e.g. a TV or outdoor digital sign) and stream back the relevant matching synchronized audio. To capture the video content, an application can be installed on the client device, which may include an imager capable of recording video. The content synchronization server can receive the captured video content from the client device and potentially matching video content and the corresponding audio content from a third-party content source.

Using the client device, the user can record a short video off the nearby digital display. The video may then be sent, manually or automatically, to the content synchronization server. The server side can analyze the video sent by the client side and will match it with the video content it receives as input from the third-party content source. The results of this matching may include identifying the video that was screened on the digital display and recorded by the user and the determining the timing of that video relative to the video content from the third-party content source. The content synchronization server can then stream the synchronized audio (and/or any other synchronized content) to the client device, enabling the user to hear the audio and/or receive the other relevant content.

Figure 1:
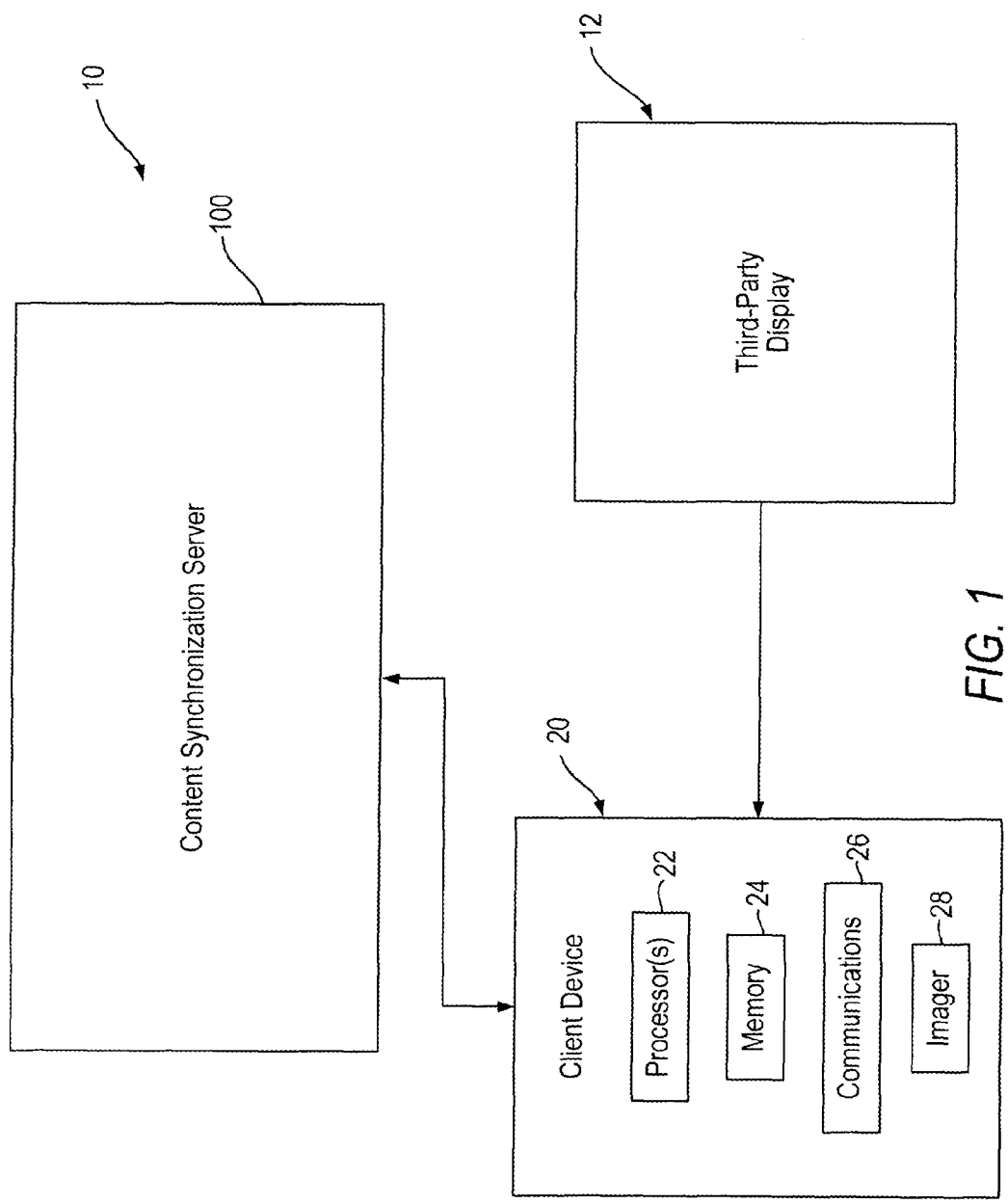
FIG. 1 shows a schematic diagram of a system for providing synchronized content, in accordance with some embodiments.

FIG. 1 shows a schematic diagram of system 10 for providing synchronized content, in accordance with some embodiments. System 10 may include third-party display 12, client device 20, and content synchronization server 100, which may be communicatively coupled to client device 20. Generally speaking, client device 20 can capture visual content presented by third-party display 12 and send at least a portion of the visual content to content synchronization server 100. Content synchronization server 100 can then identify the visual content and send relevant content, such as an audio signal synchronized with the visual content back to client device 20. A user of client device 20 may then experience the synchronized relevant content while watching the visual content on third-party display 12.

Third-party display 12 can be any display device capable of presenting visual content to a user. Thus, third-party display 12 may be, for example, a television, a computer monitor, a mobile electronic device, an electronic or non-electronic sign. The visual content presented by third-party display 12 may, therefore, range from video signals (e.g., live or prerecorded television signals, movies, video or clips) to static or semi-static digital or analog images (e.g., storefront advertisements, billboards, or works of art).

The visual content presented by third-party display 12 may be captured by client device 20. Client device 20 may be any electronic device capable of capturing visual content, such as an audio player, a video player, a music recorder, a game player, a video recorder, a camera, a radio, a cellular telephone or other wireless communication device, a personal digital assistant, a programmable remote control, a pager, a laptop computer, a desktop computer, or combinations thereof. In some cases, client device 20 may be an electronic device, such as a smartphone, for example, that can perform multiple functions (e.g. play music, display video, store pictures, and receive and transmit telephone calls).

Client device 20 can include, among other components, processor(s) 22, memory 24, communications module 26, and imager 28. Components 22, 24, 26, and 28 may all be part of client device 20 or, alternatively, individual components may be connected to client device 20 in any suitable manner. For example, imager 28 may be a removable image capturing device that can be coupled to client device 20 wirelessly or using a cable (not shown).

Processor(s) 22 may be connected to the other components of client device 20 (e.g., via a communications bus) to control and operate electronic device 101. In some embodiments, processor(s) 22 may execute instructions stored in memory 24, which may include one or more different types of memory, such as one or more of several caches, flash memory, RAM, ROM, and/or hybrid types of memory. Processor(s) 22 may include, for example, one or more microcontrollers and/or microprocessors that can execute instructions from one or more software or firmware applications stored in memory 24. Processor(s) 22 may also control one or more input/output ("I/O") modules of client device 20. Examples of I/O modules may include, for example, a digital display, an audio-output device, such as an audio-out jack or a speaker, a touch-screen interface, and/or one or more peripheral devices, such as a keyboard or mouse.

Imager 28 may include any device or devices capable of capturing visual content from third-party display 12 and formatting the digital content in a format suitable for transmission to content synchronization server 100. Thus, imager 28 may include one or more digital image sensors (e.g., CCD or CMOS sensors) that can capture visual content as still images or videos. The still images or videos may then be sent to content synchronization server 100 using communications module 26. Client device 20 may also send relevant information about client device 20, such as its physical location and/or orientation and details about imager 28, the device type, and/or the user, for example.

In some embodiments, software or firmware may be installed on, or otherwise be executable by, client device 20 may enhance the ability of imager 28 to capture visual content that may be easily recognized by content synchronization server 100. For example, client device 20 may provide automatic control of zoom and/or focus control for imager 28 in order to capture a clear and crisp version of the video content, use a high dynamic range in order to improved contrast of the video content captured, and/or apply image stabilization in order to ensure consistent results for successive captured frames. Client device 20 may also perform one or more pre-processing operations on the captured video or images, such as changing brightness levels or colors, cropping, or extracting key features, for example. Pre-processing the captured visual content may significantly reduce the computing resources required for content synchronization server 100 to identify the visual content.

Communications module 26 may include circuitry that enables client device 20 to be communicatively coupled to another device (e.g., a computer or an accessory device). Communications module 108 may allow client device 20 to connect to a communications network using any suitable communications protocol. For example, communications module 26 may create a short-range communications network using a short-range communications protocol to connect to other devices or systems located close to client device 20. For example, communications module 26 may be operative to create or connect to a local communications network using the Bluetooth™ protocol to couple with a Bluetooth™ headset. Communications module 26 may also include a wired or wireless network interface card ("NIC") configured to connect to the Internet or any other public or private network. For example, client device 20 may be configured to connect to the Internet via a wireless network, such as a packet radio network, an RF network, a cellular network, or any other suitable type of network.

As described in detail below, content synchronization server 100 may receive visual content (e.g., in the form of still images or videos) from client device 20, identify the visual content, find relevant content associated with the visual content, such as an audio signal associated with the visual content, synchronize the related content, and send the related content to client device 20. Client device 20 may receive the related content via communications module 26 and present it to the user via one or more of the I/O modules available on, or connected to, client device 20.

Thus, in some exemplary embodiments, imager 28 may record visual content being displayed by a television in the vicinity of client device 20. The television may be muted, too far away for the user to hear well, playing audio in a language unknown to the user, or otherwise providing to the user a less than optimal auditory experience. Upon capturing the visual content, client device can send the visual client to content synchronization server 100, which may identify the visual content being displayed on the television (e.g., as being broadcast by a particular television channel), find an audio signal associated with the visual content, synchronize the audio signal with the visual content, and send the audio signal to client device 20. Client device 20 may then play the audio signal via an audio output device of client device 20, such as a speaker audio-output jack, for example.

Figure 2:
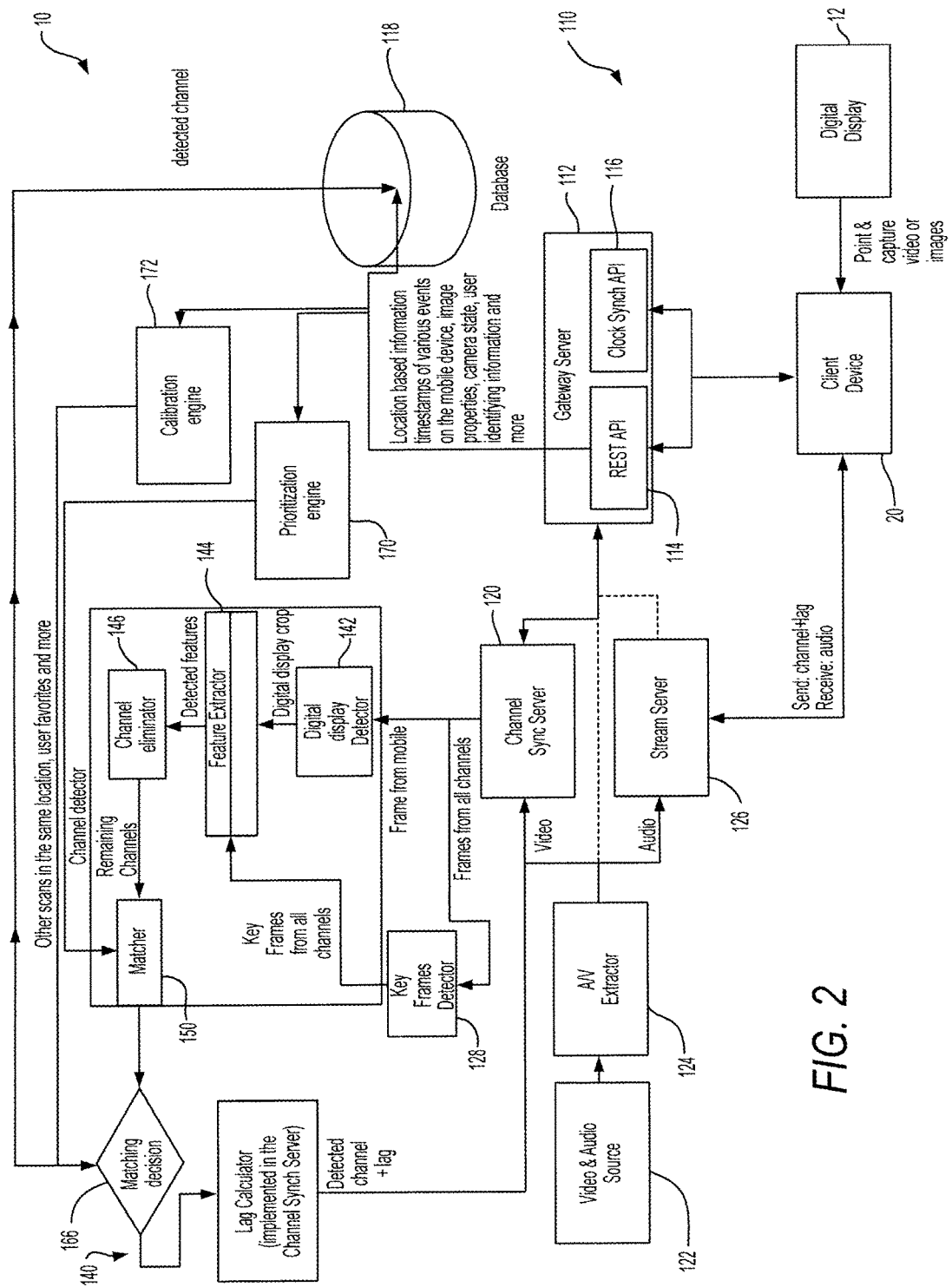
FIG. 2 shows a detailed schematic diagram of a system for providing synchronized content, in accordance with some embodiments.

FIG. 2 shows a detailed schematic diagram of system 10 for providing synchronized content, in accordance with some embodiments. In particular, FIG. 2 depicts various high level and low level modules and features that may be part of content synchronization server 100. The high-level modules depicted in FIG. 2 include content I/O module 110, which may generally be responsible for routing content from various sources to other components of system 10 and synchronizing content from various sources, and content detector module 140, which may generally be responsible for recognizing and matching content from various content sources. It should be understood that while high-level modules 110 and 140 may be useful in understanding how content synchronization server 100 functions, boundaries between high-level modules 110 and 140 may not be rigidly defined, and some low-level modules (described in detail below) may be conceptualized as being part of two or more high-level modules. Furthermore, it should be understood that content synchronization server may include one or more processors, memories, I/O devices, and communications modules to execute software or firmware for implementing one or more aspects of the embodiments disclosed herein.

Content I/O module 110 may, generally speaking, be responsible for interfacing with client device 20 (e.g., receiving captured visual content from and sending synchronized content to the client device), receiving audio/visual content from a third-party content source, calculating a lag between the captured visual content and the third-party content source, extracting frames from the captured visual content and the content from the third-party content source, and transmitting the extracted frames to content detector module 140. Content I/O module 110 may also receive a matching decision from content detector module 140, receive content matching the matched content from the third-party content source, synchronize the matched content with the captured visual content, and send the synchronized, matched content to client device 20.

Captured visual content from client device 20 may first be received at gateway server 112 of content I/O module 110. Gateway server 112 may use an Application Programming Interface ("API"), such as REST API 114, for example, to implement the transfer of the captured visual client from client device 20 to content synchronization server 100. Along with the captured visual content, gateway server 112 may also receive various other information from client device 20, such as geolocation, one or more timestamps, image properties, camera state, and/or user identifying information, for example. In some embodiments, gateway server 112 may also include clock synchronization API 116, which may be an API that receives information about a local clock running on client device 20 and compares that clock with a local clock of content synchronization server 100. Clock synchronization API 116 may continuously or periodically compare the local clocks to ensure that content synchronization server 100 always has the most current version of the local clock of client device 20.

Gateway server 112 may route the data received from client device 20 to various other components of content synchronization server 100. In some embodiments, data other than the captured video data and the local clock data may be stored in database 118. Content detector module 140 may consult the data stored in database 118 to improve the content matching process. In some embodiments, database 118 may also store captured visual content and/or local clock data received from client device 20.

The captured visual content may be sent from gateway server 112 to channel synchronization server 120. Channel synchronization server 120 may store the captured visual content in a format suitable for processing by content detector module 140. For example, while the captured visual content may be stored in the same format (e.g., as a set of still images or as a video with a particular frame rate) received from client device 20, the captured visual content may be converted to a different frame rate or a different file format to be compatible with content detector module 140.

Channel synchronization server 120 may also receive content from a third-party content source 122. Third-party content source 122 may be any content source likely to be able to deliver relevant content, which may be, according to various embodiments, the same content, similar content, or supplemental content, to the captured visual content received from client device 20. Accordingly, third-party content source 122 may be a cable interface card that receives a cable television signal or a content streaming server capable of providing a wide variety of content "on demand," for example. In some embodiments, channel synchronization server 120 may identify the type of captured visual content received from client device 20 (e.g., as visual content captured from a television signal) and choose an appropriate third-party content source from a number of available third-party content sources.

A/V extractor 124 may receive content from third-party content source 122 and extract video and audio from the content source. Extraction may occur continuously or upon request, such as when captured visual content is received at channel synchronization server 120, for example. One benefit of continuously extracting content from third-party content source 122 may be that if the captured visual content is delayed with respect to live content received from third-party content source 122, the captured visual content may have to be compared with content from the past to find matching content from third-party content source 122. Such past data may not be available, however, if A/V extractor 124 only begins to extract content upon captured visual content reaching channel synchronization server 120. Thus, if third-party content source 122 is a cable interface card, content from each available channel may be extracted on a continuous basis. On the other hand, if third-party content source 122 is an "on demand" content source, A/V extractor 124 may wait to extract content until captured visual content reaches channel synchronization server 120.

A/V extractor 124 may extract video from third-party content source 122 by sampling the video signal at a suitable sampling rate and storing the sampled frames in channel synchronization server 120. In some embodiments, the sampling rate may match the frame rate of the video signal (e.g., 25 frames per second) such that each frame is sampled and stored in channel synchronization server 120. In other embodiments, A/V extractor 124 may sample the video signal at a lower sampling rate in order to reduce the amount of data to be stored in channel synchronization server 120. The number of frames sampled per second may also be chosen as a function of an acceptable error in audio synchronization and/or the number of frames per second in the captured visual content received from client device 20. Accordingly, the sampling rate may be chosen to match the frame rate of the captured visual content and/or the sampling rate may be chosen to be as sparse as possible while ensuring that the time delay between the captured visual content and the extracted video is within a maximum acceptable offset between the captured visual content and an audio signal to be synchronized with the captured visual content.

In the case of a live video signal, the first to last frames stored from a particular channel in channel synchronization server 120 may cover a defined time period. For example, the defined time period may cover at least the maximum known delay for a television broadcast. Accordingly, if broadcasts of a television signal are known to differ by up to 30 s (e.g., among different cable providers nationwide or worldwide), 30 s of sampled video frames for each channel may be stored in channel synchronization server 120. Stored frames that correspond temporally with captured visual content received at channel synchronization server 120 may be stored until content detector module 140 returns a content matching result.

Video data typically has a frame rate upwards of 25 frames per second, which may mean that much of the video data stored in channel synchronization server 120 may be redundant. For computational efficiency, key frame detector 128 may be used to reduce the number of frames to be processed and compared during the content matching process. Generally speaking, key frame detector 128 can divide the frames stored in channel synchronization server 120 into "shots," where each shot is a sequence of continuous frames that describe a single action. A "key frame" may be chosen that is representative of the frames in that shot, such as the first frame of a new shot, for example. Key frames may be chosen from a sequence of video frames with any suitable level of granularity, but ideally each key frame should represent its shot while nontrivially reducing the number of frames to be processed. Because A/V extractor 124 may continuously extract video from third-party content source 122, key frame detector 128 may detect key frames on an ongoing basis.

Key frame detector 128 may use one or more known methods and/or one or more of the methods described below, to detect key frames. In accordance with various embodiments, key frame detector 128 may detect a new key frame when a new key frame is suggested by one or more of the following methods.

Histogram Correlation

In some embodiments, key frames may be detected using a histogram correlation process. The process may begin by calculating a histogram representation of the color distribution of the pixels in a first frame with each bin in the histogram representing a particular color or a range of colors. In other embodiments, the frame may first be converted to gray scale and then a histogram of the image may be generated where the bins (e.g., 256 bins) of the histogram represent the distribution of the pixels in the image over the gray scale. In still other embodiments, the frame may be converted to a 2-bit (e.g., black and white) image, and key frame detector 128 may generate a 2-bin histogram representing the pixels in the 2-bit image. In a like manner, key frame detector 128 can generate a histograms for each frame received from channel synchronization server 120.

Once the histograms are generated, key frame detector 128 may compare the histogram generated for a given frame with those generated for one or more of its neighboring frames (e.g., the frame immediately following the given frame). Comparing the histograms may involve calculating a correlation coefficient between the histograms with the expectation that frames that are part of the same shot will be highly-correlated while frames that are part of different shots will be lowly-correlated or uncorrelated. The correlation coefficient calculated during the comparing may be compared to a threshold value, and key frame detector 128 may determine that if the correlation coefficient is less than the threshold value, the neighboring frame is a key frame (e.g., the first frame of the next shot in the video).

In some embodiments, rather than the threshold being a fixed value, the correlation coefficient may be compared to a threshold value that adapts to an average correlation value of the last 'N' (e.g., 5, 10, 15, or 30) frames. In this manner, key frame detector 128 can avoid detecting excess key frames even for single shots with relatively low correlation between successive frames. In further embodiments, key frame detector 128 can calculate the correlation coefficient between the histogram generated for the current frame with the histogram generated for the previous key frame. If the correlation coefficient is below a threshold value, which may be a lower threshold than that used to compare neighboring frames, for example, the current frame may be designated as a key frame.

Local Keypoints

Key frame detector 128 may, additionally or alternatively, detect key frames on the basis of analysis of a frame's "keypoints." As used herein, a keypoint may denote a notable feature of an object in an image that may be extracted and used to identify the object in another image despite changes in scale, translation, rotation, illumination, and distortion. Keypoints may typically be found in high-contrast portions of an image, such as edges.

For each frame, key frame detector 128 can extract local key points and extract local feature descriptors using a known keypoint algorithm, such as Kaze Features, Speeded-Up Robust Features ("SURF"), or Scale Invariant Feature Transform ("SIFT"), for example. Each frame may then be compared to the previous frame (or previous 'N' frames) using a suitable method, such as Random Sample Consensus ("RANSAC") algorithm, which can determine the correspondence between keypoints in the frames being compared. Key frame detector 128 may analyze the correspondence data to determine whether a change has occurred between the two frames. For example, if a keypoint has moved by a threshold number of pixels (e.g., 50) between the two frames or if a keypoint does not exist in both frames being compared, key frame detector 128 can declare that the keypoint has changed. If the percentage of changed keypoints exceeds a certain threshold value (e.g., 30%), key frame detector 128 can consider the new frame a key frame.

Semantic Feature Filters

Additionally, key frame detector 128 may recognize semantic features located in each frame and use the changes in the recognized features to determine whether or not to designate a particular frame as a key frame. The semantic features may include, but are not limited to, a face detector, a commercial logo detector, a text detector, a car detector, a sky detector, a scene classifier, and the number of segments in an image after it is segmented by a segmentation algorithm. Details regarding the recognition and extraction of semantic features are discussed in more detail below.

Key frame detector 128 can group the output of each detector into a feature vector and store the feature vector for each frame. The feature vectors for each consecutive set of frames (or the last group of 'N' frames) may then be compared. If the number of changes between the feature vectors (e.g., the Hamming distance between the feature vectors) is larger than a threshold value (e.g., 3), key frame detector 128 may consider the new frame a key frame.

Figure 3:
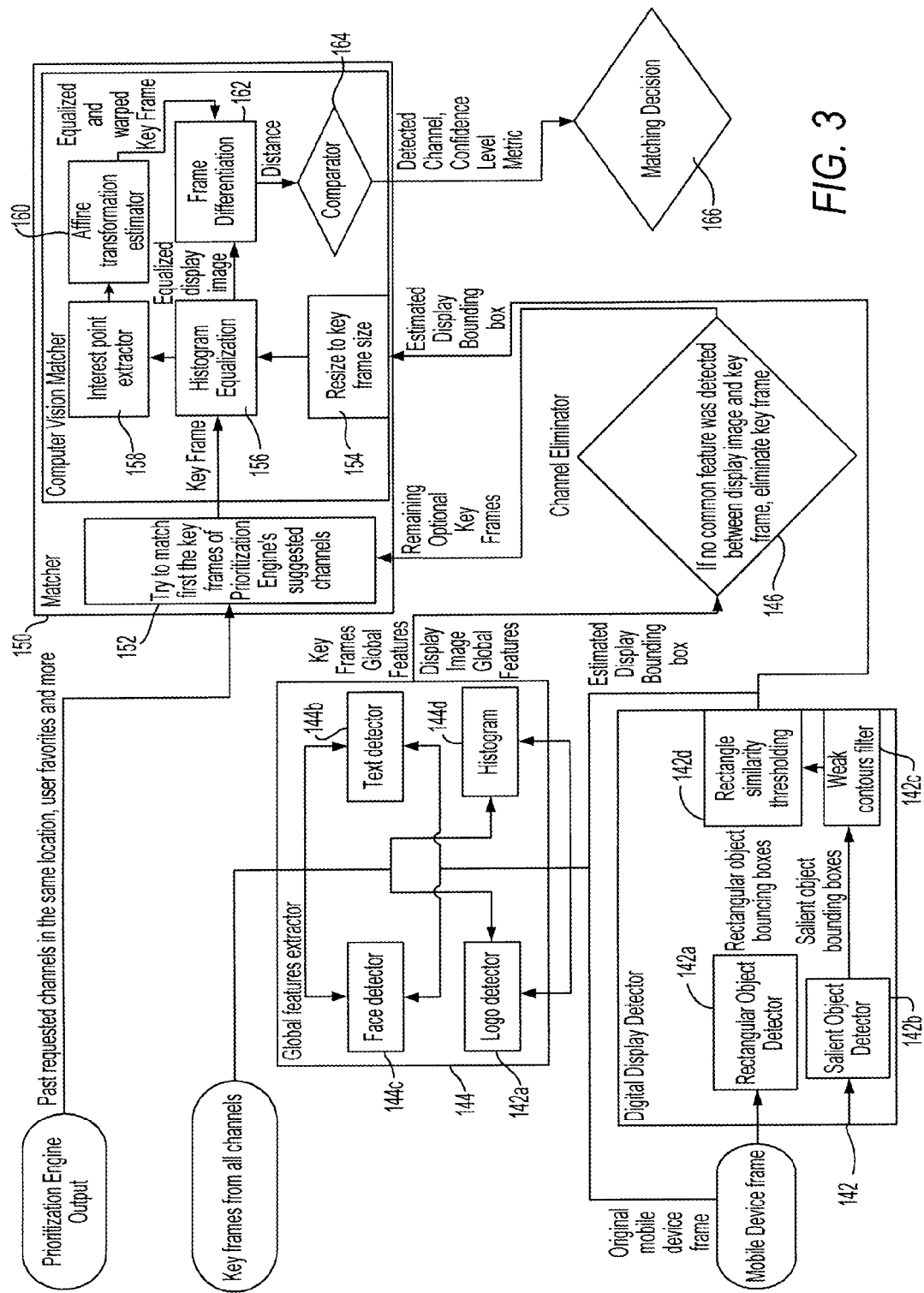
FIG. 3 shows a detailed schematic diagram of a channel detector component diagram, in accordance with some embodiments.

The key frames designated by key frame detector 128 and the frames from the captured visual content may be sent to content detector module 140, which can match the captured visual content to content available via third-party content source 122. Reference is also made to FIG. 3, which shows a detailed schematic diagram of content detector module 140, in accordance with some embodiments.

Captured visual content frames may be sent from content I/O module 110 to digital display detector 142 of content detector module 140. Digital display detector 142 can be used to detect a digital display within the captured visual content frames and extract the digital display from the frames. Extracting the digital display from the captured visual content frames may enable content detector module 140 to more easily compare the captured visual content with the frames received from key frame detector 128 and thereby identify the captured visual content. Digital display detector 142 may use one or more known methods and/or one or more of the methods described below, to detect the digital display. In accordance with various embodiments, digital display detector 142 may detect a digital display in a frame when the coordinates of the digital display in the frame are suggested by one or more of the methods.

The Hough Transform has been widely used in computer vision applications to identify geometric shapes. Because digital displays of the kind under consideration typically have distinct quadrilateral shapes, which can vary depending on the viewing angle, the Hough Transform may be used to identify a digital display in a video frame. However, if the frame contains multiple quadrilateral objects, or when a part of the digital display in the frame is occluded, applying the Hough Transform alone may not consistently detect the digital display in the frame.

In order to confidently identify the digital display in a given frame, the Hough Transform may be combined with a salient object detection algorithm, which can serve to find the most "interesting" object in an image namely, in this case, the instance of a digital display in an image. Using salient object detection, an input image (i.e., a frame of captured video content) can be assumed to contain a background and an object, which may be anywhere in the image and may have an arbitrary shape. The goal of salient objection detection can be to separate the object from the background. Combining the Hough Transform with salient object detection can help to overcome limitations attendant to using approach separately.

According to some embodiments, digital display detector 142 may include rectangular object detector 142a, salient object detector 142b, weak contours filter 142c, and rectangle similarity threshold module 142d. Rectangular object detector 142a and salient object detector 142b may both output one or more bounding boxes potentially detecting the digital display in the frame. Digital display detector 142 can output a binary (i.e., yes/no) output that indicates whether or not a digital display has been identified based at least on the number of contours detected in the saliency map (described in detail below), and whether the outputs of the two detectors match one another within a threshold.

Figure 4:
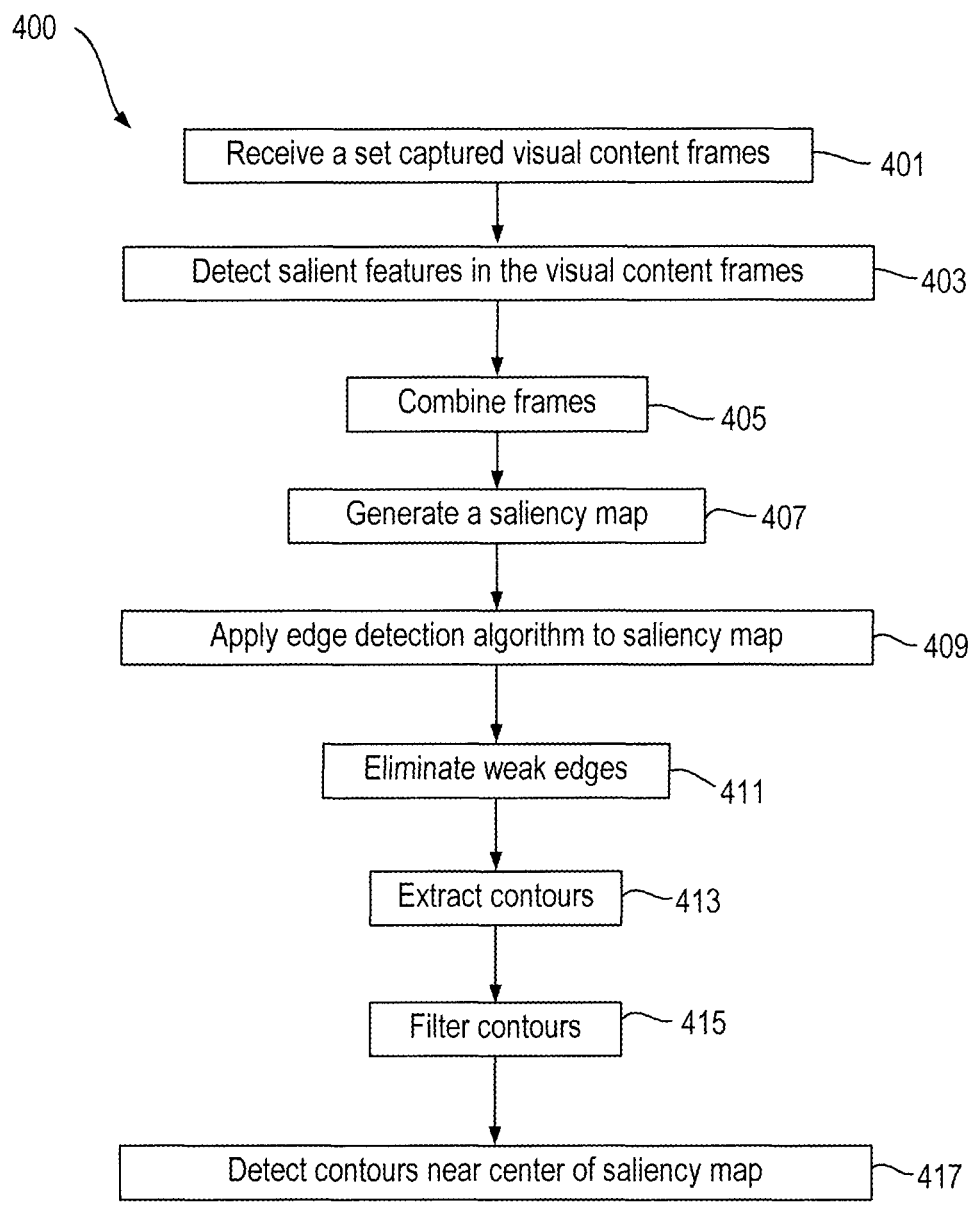
FIG. 4 shows a flowchart of an exemplary process for detecting a digital display using salient object detection, in accordance with various embodiments.

Reference is now made to FIG. 4, which shows a flowchart of an exemplary process 400 for detecting a digital display using salient object detection. Process 400 may begin at step 401, in which a digital display detector (e.g., digital display detector 142 of FIGS. 2 and 3) can receive a set of captured visual content frames. The captured visual content frames may be frames of a video captured using a client device (e.g., client device 20 of FIGS. 1 and 2) from a digital display (e.g., third-party display 12 of FIGS. 1 and 2). The number of frames received at step 401 may depend upon a number of factors, including the length and frame rate of the visual content (assuming the captured visual content is a video) and whether or not the visual content was edited (e.g., shortened or compressed by removing some frames).

At step 403, the digital display detector may detect salient features in each of the frames. Any known method may be used to detect salient features in a given frame, or salient features may be detected using the methods disclosed below. The results of a salient feature detection process for a given frame may be combined with the results for each other frame received in step 401 in order to detect salient objects that exist in all (or most) of the frames. At step 405, frames may be combined on the basis of a "bitwise or" operation that may effectively integrate the output of a salient feature detection process on a pixel-by-pixel basis.

In some implementations, digital display detector 142 can generate a histogram representation of the color distribution of the pixels in a first frame with each bin in the histogram representing a particular color, a range of colors, or a range of grayscale values. In the case where the bins in the generated histogram do not faithfully represent the actual color of the pixel, the histogram may be considered a modified histogram. Each bin in the modified histogram may be assigned a color probability as a function of the likelihood that the bin represents a portion of a salient object. The modified histogram may then be back projected on the original image, and each pixel can be assigned with a probability based on the corresponding histogram bin in the image. Pixels with probabilities exceeding a threshold may be considered as part of a salient object, while pixels with probabilities less than the threshold may be ignored.

Detecting features may additionally or alternatively involve calculating the saliency of each pixel in a frame by comparing its color contrast to all other pixels in the image. For example, the saliency of a particular pixel, $I_k$, may be calculated as:

$$S(I_k) = \Sigma_{\forall I_i \in I} D(I_k, I_i) \quad (1)$$

where $D(I_k, I_i)$ is the color distance metric between $I_k$ and $I_i$ in the L*a*b space. In general, the higher the saliency calculated in Eq. (1), the higher the probability that the pixel is part of a salient object. In some embodiments, before determining the saliency of each pixel in a frame, the colors in the frame may be quantized into bins, where each bin represents a continuous range of colors in the real color (e.g., RGB) color space to reduce the computational demands of the saliency calculation.

Still further, recognizing that the salient feature to be recognized in process 400 is a digital display, the digital display detector may analyze brightness levels of pixels in each frame. Accordingly, the digital display detector may combine the luminance channel from all received frames together using a bitwise or operation. Salient features may then be detected upon determining that a set of pixels defining an object was consistently brighter than other pixels in the frames.

Still further yet, digital display detector may rely on background detection to detect a potential digital display in the captured visual content frames. Background detection may rely on the fact that the pixels representing the digital display will change at a much higher rate than pixels representing the background. Accordingly, pixels that undergo a high rate of change in comparison to other pixels in the frames may be considered as being part of a potential digital display. Recognizing that the pixels corresponding to the digital display may shift from one frame to the next due to the imager moving or shaking, for example, the pixels may be remapped so that they correspond to the same location in each frame.

At step 407, the detected salient features may be combined into a saliency map using mean-shift segmentation. After the saliency map is generated, an edge detection algorithm (e.g., Sobel, Canny, or Prewitt) may be applied to the saliency map at step 409. Next, the detected edges may be compared to a threshold to eliminate weak edges at step 411, and contours may be extracted at step 413.

At step 415, the extracted contours may be filtered using assumed facts about the shape of the digital display. For instance, because displays usually have well-defined aspect rations, such as 4:3 or 16:9, for example, contours with dimensions that depart from those ratios by a threshold amount may be ignored, although because the aspect ratio may change as a function of the angle between the camera and the display, contours with aspect ratios close to those typically associated with digital displays may be maintained through the filtering step. Furthermore, contours that enclose an area smaller than a defined threshold may also be discarded during the filtering process.

At step 417, the digital display detector can extract one or more contours located close to the center of the saliency map. Because a user attempting to capture video from a digital display is likely to place the digital display in the center of the video capturing window, filtering out salient objects that are located away from the center of the saliency map may facilitate location of the digital display over other detected salient features.

Figure 5:
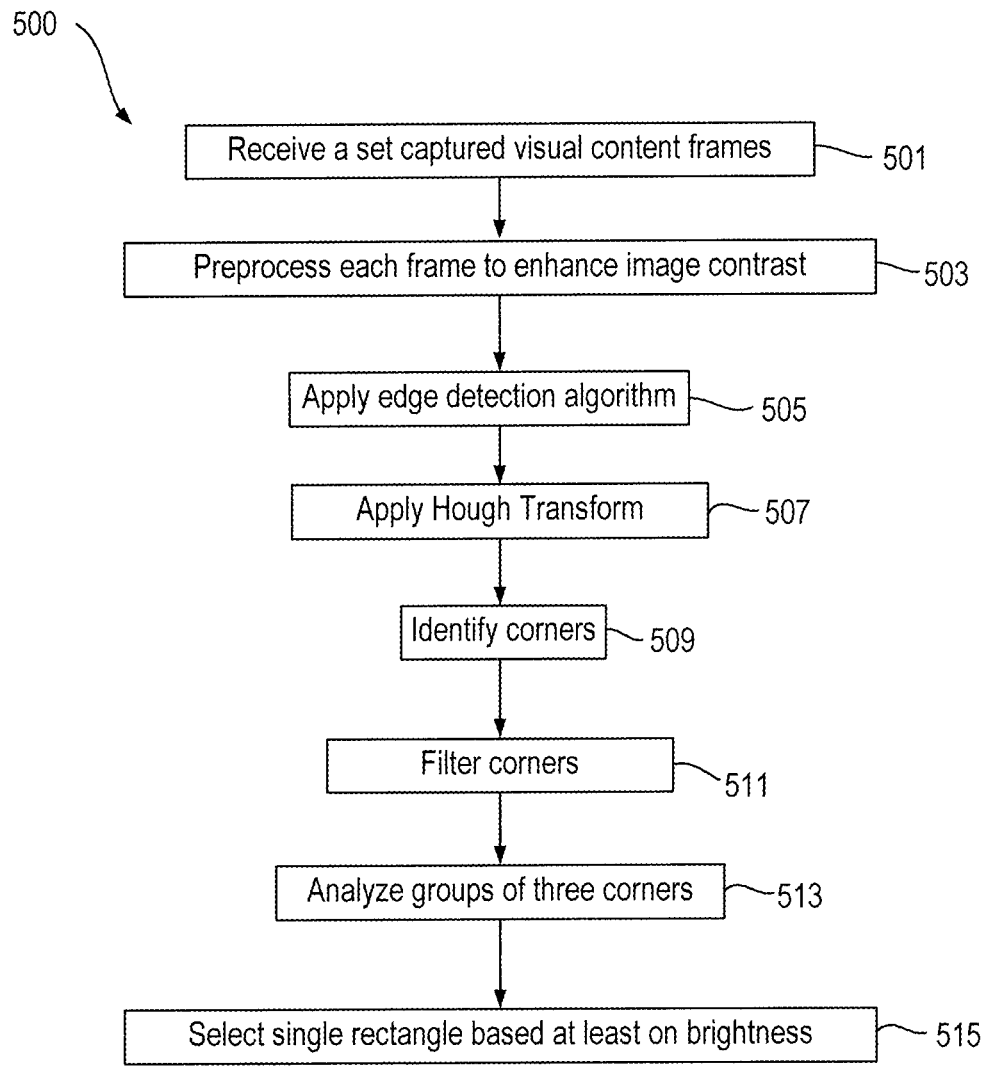
FIG. 5 shows a flowchart of an exemplary process for detecting a digital display using a Hough Transform algorithm, in accordance with some embodiments.

Reference is now made to FIG. 5, which shows a flowchart of an exemplary process 500 for detecting a digital display using a Hough Transform algorithm, in accordance with some embodiments. Process 500 may begin at step 501, in which a digital display detector (e.g., digital display detector 142 of FIGS. 2 and 3) can receive a set of captured visual content frames. Step 501 may correspond to step 401 of FIG. 4, for example.

At step 503, the digital display detector can preprocess each frame in order to enhance the image and increase its contrast. Increasing the contrast may be accomplished by linearly multiplying each pixel's value. Increasing the contrast in this manner may facilitate locating a digital display in the frames because digital display frames are typically black, and increasing the contrast in the frames can facilitate differentiation of the digital display's frame from its contents and from the background. At step 505, the digital display detector can apply an edge detection algorithm, such as the Sobel, Canny, or Prewitt edge detection schemes, for example, to each frame to generate an edge map.

At step 507, the digital display detector may apply the Hough Transform to find and mathematically define lines in the edge map. Once the lines are defined, the digital display detector may identify the corners in each frame at step 509. Identifying the corners may involve finding the intersections of all of the lines defined by the Hough Transform. At step 511, the identified corners may be filtered such that groups of identified corners that are close to one another (e.g., within a radius of 50 pixels) may be de-duplicated. In some embodiments, all but one corner of a group of closely-spaced corners may be filtered out in step 511.

At step 513, the digital display detector may analyze each group of three corners to find a minimum area bounding rectangle for each group. Inspecting every three corners allows one corner of the digital display to be missing (e.g., due to occlusions or bad lighting conditions) making for a more robust analysis than would be possible if four corners were required. These rectangles may then be filtered if they do not match a set of defined parameters. The parameters may be defined to filter out rectangles that are not likely to represent a digital display. Accordingly, the digital display detector may filter out rectangles that are rotated more than a defined angle from a reference line parallel to the upper and lower bounds of the frame or rectangles that do not have an aspect ratio within a certain range.

At step 515, the digital display detector may select a single rectangle based on brightness level. The brightness level for each rectangle may be calculated by analyzing the luminance value for each pixel in each frame and combined (e.g., integrated, summed, or averaged) over all frames in the set of captured video content frames. The brightest rectangle may then be chosen as the digital display.

As noted above, outputs of process 500 may be compared with outputs of process 400 to increase that probability of finding the digital display in a set of captured visual content frames. In particular, the digital display detector may indicate that it has found a digital display in the set of frames upon determining that (1) there are only a few (e.g., 5 or fewer) contours in the saliency map and/or (2) the results of the two detectors are similar within a threshold. It should be understood, however, that the digital display detector may rely on either process 400 or process 500 or any process known in the art to detect a digital display in a set of video frames.

Attention is now returned to FIG. 3, which depicts the extracted key frames and the captured visual content frames being received at feature extractor 144. Information regarding the location of the digital display within the captured visual content frames may also be received from digital display detector 142 in order to ensure that features extracted from these frames are from the digital display and not from its surrounding environment. Feature extractor 144 may generally identify one or more features from each of the extracted key frames and at least one of the captured visual content frames. Extracted key frames that are missing the features extracted from the captured visual content frame may be discarded as representing an unlikely match to the captured visual content. Discarding as many key frames as possible using feature extraction may significantly lessen the burden on content synchronization server 100 during the more computationally intensive matching process, which will be described in detail below.

The feature extraction algorithms disclosed below may be particularly well suited for the task of culling large numbers of extracted key frames because of their ability to filter large number of frames with relative computational efficiency and with a very low false negative rate. That is, feature extraction may facilitate eliminating key frames that are very different from one or more reference captured video content frames based on a detected unsimilarity between the key frame and the reference frame, the number of which can amount to a significant portion of the total number of key frames received at feature extractor 144.

Feature extractor 144 may detect any suitable feature types from among the captured frames and the key frames, including a TV channel logo, text, faces, and dominant colors, for example, the detection of which are described in detail below. It should be understood that other types of features, such as the existence of a corporate logo in a frame, for example, may be recognized in a similar manner, and the feature types disclosed herein should not be understood as a complete list of extractable features.

Key frames may be eliminated under a number of circumstances, which may be chosen to reduce the false-negative rate. For instance, if a captured visual content frame contains either a TV channel logo, text, or a face, but a key frame does not, the key frame may be eliminated. Similarly, a key frame may be eliminated if the captured visual content frame contains a dominant color not present in the key frame. On the other hand, the absence of a feature in a captured visual content frame might not be used to eliminate key frames as it is more likely that features be present but undetected in the captured visual content frames than in the key frames extracted from third-party content source 122.

In some embodiments, one particular frame may be chosen from the captured visual content frames to serve as a reference frame. The reference frame may be chosen in order to eliminate the highest possible number of unlikely frames from among the set of key frames. Thus, the reference frame may be chosen based on the existence of a large number of extracted features (e.g., a frame having a face, a TV logo, text, and a particularly distinct dominant color) such that key frames lack even one of the extracted features may be discarded.

Logo Detection

Feature extractor 144 may first attempt to detect and extract a logo, such as a TV channel logo from the reference frame and each of the key frames using logo detector 144*a*. While any suitable process may be used to detect and extract a logo, the following method may be particularly advantageous because its ability to detect a logo that is not statically placed in a video as well as one that is viewed from many different angles and under varied lighting conditions.

First, logo detector 144*a* may build a database of logos, such as a database of TV channel logos with one logo for each channel (e.g., CNN, ESPN, etc.). The database may include affine transformations of each logo generated to supply views of each logo from various angles and with various width/height scaling. Next, logo detector 144*a* can train a Histogram of Gradients detector to extract the contours of the logos in the database.

Turning to the extracted key frames, logo detector 144*a* may filter out pixels not belonging to the three most dominant colors in a target candidate logo (i.e., one of the logos in the database of logos). Filtering the key frames by color in this manner may help to narrow the search area for finding a logo in the key frame. In particular, logo detector 144*a* may narrow the search area to a polygon bounding an area that contains all of the three most dominant colors in the target logo. Once the search area is so narrowed, the Histogram of Gradients detector can extract the contours of the features in that area to search for a match from among the logos in the database of logos using a sliding window, for example.

If there is a match for a specific logo, the output for that specific logo detector may be designated a "1," otherwise it can be designated a "0." In this manner, logo detector 144*a* can give a binary result for the existence of a particular logo in each key frame.

Furthermore, logo detector 144*a* can assign a confidence value to the result based on the location of the logo in the key frame relative to the location of the logo in the reference frame. In general, the confidence value may be higher if the logo detected in the key frame is in the same location as the logo from the reference frame. If more than one logo is detected in a key frame, feature extractor 144 can ignore those logos with a low confidence value.

Text Detection

Text detector 144*b* may determine whether there is at least one text segment in the reference frame and, if a text segment exists, eliminate any key frames that do not include a text segment. In order to locate a segment of text in a natural image (as opposed to a scan of a printed page) an operator such as the Stroke Width Transform may be applied, which may be capable of detecting text segments of various scales, orientations, and fonts. The Stroke Width Transform may compute the pixel width of likely text "strokes" (i.e., contiguous parts of an image that form bands of nearly constant width).

Components may then be identified that contain a number of strokes. Each component may be considered a potential portion of text (e.g., a letter, number, or other glyph). Components with particularly large variance in their stroke's widths may be rejected as can components with aspect ratios outside a defined range (e.g., 0.1-10). Remaining components may be considered text candidates, which may be combined to detect words and other combinations of text.

As with logo detector 144*a*, text detector 144*b* can assign a confidence value to the text segments in each key frame relative to the location of the text segment in the reference frame. If text is present in the reference frame but absent in the key frame, the key frame may be eliminated.

Face Detection

Many different algorithms exist for locating a face in an image, such as the Viola-Jones face detection algorithm, for example. Face detector 144*c* may use any one of the known facial-detection algorithms to determine whether the reference frame includes a face. If there is at least one face in the reference frame, face detector 144*c* may run the facial detection algorithm on the key frames. Any key frame without a face may be eliminated. A confidence value may be assigned to each key frame based on the location of the face in each key frame relative to the location of the face segment in the reference frame. In other embodiments, if face detector 144*c* detects more than one face in the reference frame, key frames with less than the number of detected faces may be eliminated. For example, if face detector 144*c* detects five faces in the reference frame, any key frame with less than five detected faces may be discarded.

Color Histograms

Feature extractor 144 may also use the existence of a dominant color in the reference frame to form the basis for eliminating a number of key frames using histogram module 144*d*, for example. A particular frame may be considered to have a dominant color if the largest peak in the frame's color histogram is separated from the next highest peak by a threshold value. It may be advantageous to generate the a histogram for the reference frame and each key frame with a relatively small number of bins (e.g., 32 bins rather than 256) to minimize the importance of any shifts in color tones due to the angle at which the reference frame was captured and the lighting conditions under which the reference frame was captured.

Each key frame may then be compared against the reference frame to determine if the key frame shares the reference frame's dominant color. For example, the bin corresponding to the reference frame's dominant color may be examined for each key frame. If that bin has a value (e.g., a percentage of pixels) above a defined threshold, that frame may be kept. In some embodiments, key frames may also be kept if one of the neighboring bins exceeds the threshold, or if the combination of the corresponding bin and its neighboring bins exceeds the threshold. Key frames not meeting these criteria may be discarded.

Results from feature extractor 144 may be passed on to channel eliminator 146, which may eliminate a particular set of key frames that have very low likelihood of matching the captured visual content. For example, a particular set of key frames may correspond to a TV channel extracted by A/V extractor 124 from third-party content source 122 or from a particular on-demand content item. Channel eliminator 146 may, therefore, determine whether any key frames remain in each key frame set passed to feature extractor 144. By thus filtering out sets of key frames, irrelevant channels or on-demand content items may be ignored during the following matching process.

The key frames from any channels or on-demand content items remaining after processing by channel eliminator 146 may be sent to matcher 150. The goal of matcher 150 may be to determine which channel or on-demand content item was scanned by client device 20. In order to assist matcher 150 in this process, prioritization engine 170 and calibration engine 172 may analyze data received from client device 20 and/or other data stored in database 118 to make the matching process more efficient.

Prioritization engine 170 may generate a list of channels or on-demand content items that are most likely to match the visual content captured by client device 20. To generate this list, prioritization engine 170 may analyze a host of data passed from client device to content synchronization server 100 and/or other data stored in database 118.

According to some embodiments, prioritization engine 170 may receive data regarding the physical location of client device 20 (e.g., GPS data, WiFi data, or cellular data). Database 118 may then be consulted to determine whether any other users scanned visual content at that location, either concurrently or at some time in the past. For example, if prioritization engine 170 determines that client device 20 captured visual content from a digital display at a particular sports bar in New York City, database 118 may be consulted to determine if any other users ever attempted to capture visual content from that location. If prioritization engine finds such a match, the channel, channels, or on-demand content detected from that location can be prioritized when attempting to find a match for the visual content detected by client device 20.

The degree to which a particular channel or on-demand content item is prioritized may depend on a number of factors, such as how close in time hits found in database 118 are to the time that the visual content was captured by client device 20 and the number of known digital displays at the location, for example. Thus, if the visual content captured by client device 20 was captured only moments after another user captured visual content at the same location, the channel or on-demand content item detected for the previous user may be prioritized more highly than a channel or on-demand content item captured at that location a week earlier. Further, data regarding other channels or on-demand content identified at a particular location may be given less priority if it is known that that location has ten digital displays that typically show different content.

In some embodiments, prioritization engine 170 may consult a list of the user's favorite channels or on-demand content items and prioritize those channels for analysis by matcher 150. The list may be generated locally on client device 20 and/or based on the user's history interacting with content synchronization server 100. The list may be stored locally on client device 20 and/or in database 118.

In still other embodiments, the user of client device 20 may manually suggest a channel or on-demand content item for prioritization. Thus, if the user knows or believes to know the source of the content being displayed on a digital display in the user's vicinity, she may provide that information to prioritization engine 170 (e.g., using a user interface may be provided on client device 20). Thus, if the user knows or believes that she is watching a football game on ESPN, she may provide that information to prioritization engine 170, which can then suggest that matcher 150 attempt to match that channel before any other channels. Similarly, if the user believes that she is watching a particular movie from an on-demand content source, she may provide that information to prioritization engine 170 in order to have matcher 150 attempt to match that on-demand content item before any others.

Prioritization engine 170 may then provide a list of suggested channels or on-demand content item to matcher 150 such that matcher 150 can attempt to match the captured visual content with the most likely potential matches available via third-party content source 122. The list provided by prioritization engine 170 may be provided in order of the engine's confidence in the suggested results.

Calibration engine 172 may analyze the same data or similar data as prioritization engine 170 and/or the list of suggested channels or on-demand content items generated by prioritization engine 170 in order to reduce a confidence threshold required for matcher 150 to declare a match between the captured visual content and a potential match. Accordingly, based on the confidence level ascribed to a particular channel or on-demand content item, calibration engine 172 can reduce the confidence level required before matcher 150 declares a match. In this manner, calibration engine 172 can reduce the rate of misdetections by matcher 150.

Matcher 150 can receive several inputs from other modules of content synchronization server 100 in order to match captured visual content with content extracted from third-party content source 122. Channel eliminator may provide matcher 150 with the key frames from channels and on-demand content items not eliminated during the channel elimination process. Digital display detector 142 may provide matcher with the captured visual content frames and information regarding the location of the digital display in the frames. Still further, prioritization engine 170 may send matcher 150 suggestions for which channels or on-demand content items to attempt to match first, and calibration engine 172 can allow matcher 150 a wider confidence range for declaring a match for certain channels or on-demand content items.

Matcher 150 may include several sub-modules, including prioritization module 152, image processing module 154, histogram equalization module 156, interest point extractor 158, affine transformation estimator 160, comparator 164, and matching decision maker 166. These modules may work with one another to edit and compare incoming captured visual content frames and key frames in order to determine whether the content source for a particular set of key frames matches the captured visual content. Upon determining that a match exists (or that no match exists) between the captured visual content frames and a set of key frames, matching decision maker 166 of matcher 150 may generate a matching decision.

Figure 6:
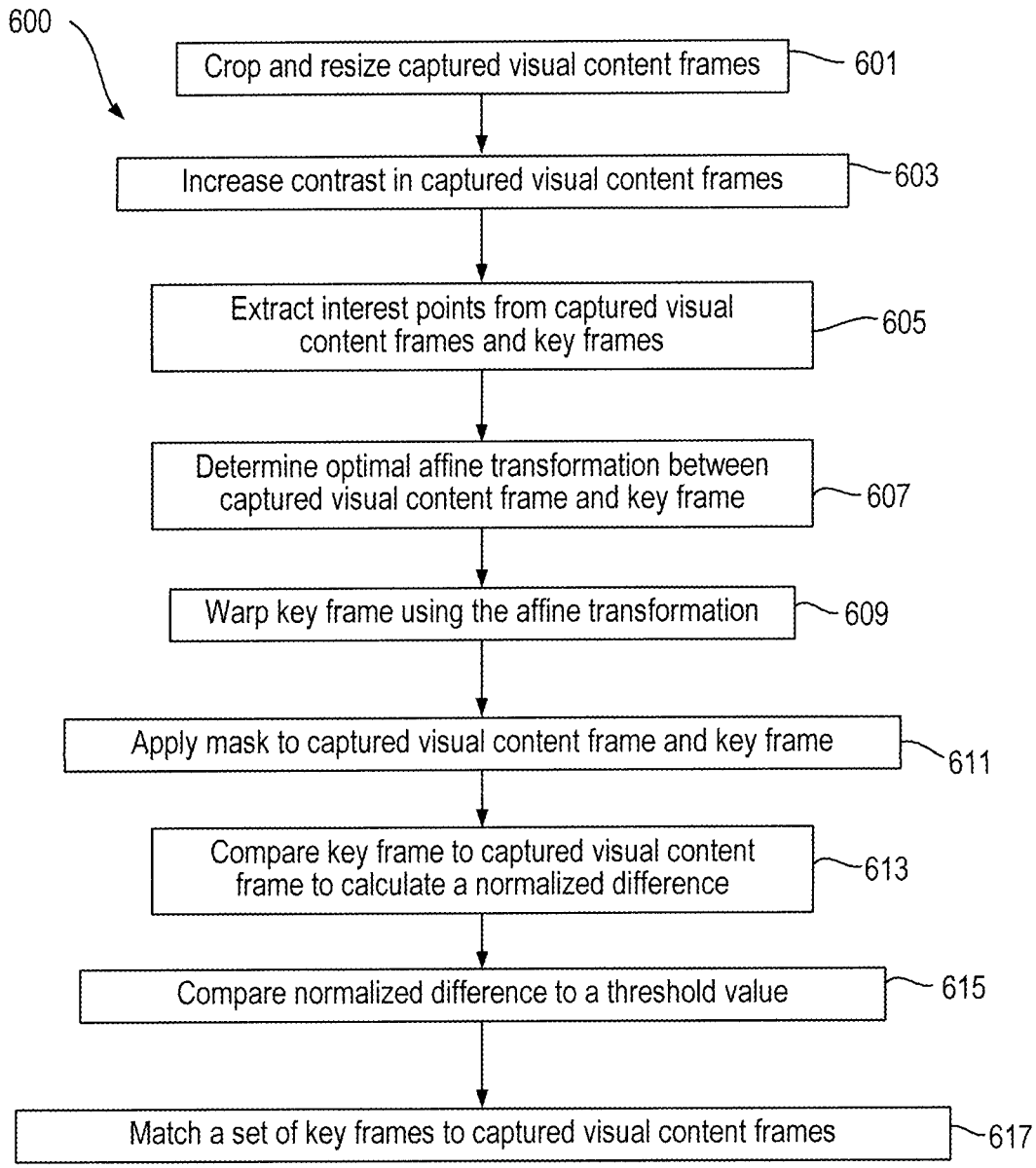
FIG. 6 shows a flowchart of an exemplary process for matching content, in accordance with various embodiments.

Attention is now turned to FIG. 6, which shows a flowchart of an exemplary process 600 for matching content, in accordance with various embodiments. Process 600, which may be implemented by a module and/or submodules of a content synchronization server (e.g., matcher 150 and/or submodules 152-164 of content synchronization server 100), may begin at step 601 in which a series of captured visual input frames may be cropped and resized in an image processing module (e.g., image processing module 154).

The captured visual input frames may be frames captured using a client device (e.g., client device 20) as described above. The matcher may receive information, in the form of coordinates, for example, regarding the location of a digital display in each frame (e.g., as determined by digital display detector 142). The image processor may then crop the captured visual input frames in order to extract the portion of the frames containing the digital display and rotate and resize the extracted portions to match, to the extent possible, the size and proportions of the key frames received from a content I/O module (e.g., content I/O module 110) of the content synchronization server.

At step 603, histogram equalization module 156 can use histogram equalization to increase the contrast of the captured visual input frames. Histogram equalization may be understood as an image processing technique that can enhance contrast in an image by adjusting pixel intensities. Histogram equalization may facilitate extraction of interest points from the captured visual input frames and the key frames at step 605. In some embodiments, histogram equalization may also be performed on the key frames.

At step 605, an interest point extractor 158 can extract interest points from the captured visual input frames and the key frames. Extracting interest points in step 605 may be similar to the process of extracting key points described above. Thus, interest point extractor 158 can extract interest points using one or more known keypoint algorithms, such as Kaze Features, SURF, or SIFT, for example. In some embodiments, an optical flow algorithm may be used to map the key frame to the captured input frame based on the interest points extracted in step 605.

At step 607, affine transformation estimator 160 can determine an optimal affine transformation to map the interest points in the key frame to the interest points in the captured visual content frame employing a matching algorithm such as RANSAC.

At step 609, affine transformation estimator may warp the key frame using the affine transformation calculated in step 607 and transform the warped key frame to grayscale. The captured input frame may also be converted to grayscale at step 609.

At step 611, a mask may be applied to the key frame and captured visual content frame in order to ignore certain areas of the images. For example, areas of the images that are smooth and lie between strong edges may be ignored, as can pixels with zero value. Applying such a mask may improve the comparison between the captured visual content frame and the key frame by ignoring areas of the image that are especially susceptible to distortion.

At step 613, frame differentiation module 162 can compare the key frame the captured visual content frame. In some embodiments, the absolute value of the difference between the two images may be taken. The square root of the L1 norm of the difference may then be calculated to determine a normalized difference between the two images.

At step 615, the normalized difference may be compared to a threshold value using comparator 164 and the results may be passed to matching decision maker 166. At step 617, matching decision maker 166 can take the output from comparator 164 (for all or a subset of captured visual content frame/key frame comparisons) to determine which channel or on-demand content item was most likely the one scanned by the user. In order to make the determination, matching decision maker 166 may calculate a confidence level metric for each channel or on-demand content item. The confidence level metric may be determined on the basis of how closely the set of key frames for the channel or on-demand content item matched the set of captured visual input frames as measured by the normalized difference. The confidence level metric may then be compared to a minimum confidence level set by calibration engine 172. If the confidence level metric for a particular channel or on-demand content item exceeds the minimum confidence level set by calibration engine 172, matching decision maker 166 can indicate that the channel or on-demand content item is a match for the captured visual content.

Once matching decision maker indicates that a match has been found for the captured visual content that is available via third-party content source 122, content synchronization server 100 may begin the process of providing synchronized content related to the captured visual content to client device 20.

In some embodiments, the related content may be the audio stream associated with the captured visual content and the matched content available via third-party content source 122. However, it should be understood that any type of related content may be provided to client device 20, including content related to the captured visual content, such as bonus material (e.g., "behind-the-scenes" content, exclusive interviews, quizzes, images, music videos, etc.), social media feeds discussing the captured visual content, user interfaces for voting on some aspect of the captured visual content, advertisements, and so on. Because an audio stream corresponding to visual content may require the closest synchronization of all potential related content, however, the related content synchronization process will be disclosed assuming the related content is the audio stream corresponding to the captured visual content.

FIG. 7 shows a flowchart of an exemplary process 700 for providing synchronized content, in accordance with some embodiments. In order to synchronize the audio signal for the matched content, which may be streamed from third-party content source 122, with the captured visual content, channel synchronization server 120 can calculate the difference between the local clock of client device 20 and the local clock for content synchronization server 100. Accordingly, process 700 may begin at step 701 in which a client device 20 can send a timestamped packet to clock synchronization API 116 of content synchronization server 100.

At step 703, clock synchronization API 116 can attach its own timestamp to the packet and return the packet to client device 20. Steps 701 and 703 may be repeated 'N' times (e.g., 20, 50, 100, or 1000 times). At step 705, the clock difference between client device 20 and content synchronization server 100 may be determined as an average of the clock differences over the N times steps 701 and 703 were repeated.

Subsequently or simultaneously, process 700 may proceed to determine the lag between the captured visual content and the content received from third-party content source 122. Thus, at step 707, channel synchronization server 120 can store frames extracted from third-party content source 122 by A/V extractor 124. The frames represent the matched content as determined by matching decision maker 166. Each of these frames may be associated with a timestamp consistent with the local clock of content synchronization server 100

At step 709, channel synchronization server 120 can store captured visual content frames received from client device 20. Each of these frames may be associated with a timestamp consistent with the local clock of client device 20.

At step 711, channel synchronization server 120 can obtain the closest frame-to-frame match between the captured visual content frames and the frames extracted by A/V extractor 124 and compare the timestamps thereof to calculate the lag between frames received from client device 20 and the frames received from A/V extractor 124.

In some embodiments, channel synchronization server 120 may combine the results of two capture frames to more accurately calculate the lag between the captured visual content frames and the frames extracted by A/V extractor 124. In these embodiments, channel synchronization server 120 may take two captured visual content frames, c0 and c1, with timestamps indicating that they are $\Delta_c$ seconds apart. The best matches of the frames extracted by A/V extractor 124 are then found for the two captured visual content frames, s(c0) and s(c1), respectively. Two combine-match frames may then be determined from among the frames extracted by A/V extractor 124 as follows:

$$S(c0)=[s(c0,t0)+s(c1,t0+\Delta_c)]/2 \quad (2)$$

$$S(c1)=[s(c1,t1)+s(c0,t1-\Delta_c)]/2 \quad (3)$$

Picking the best matched frame from among S(c0) and S(c1), the channel synchronization server can return either t0 or t1−$\Delta_c$ for choosing the proper frame from which to determine the lag result.

At step 713, channel synchronization server 120 can calculate the playback delay as the difference between the calculated lag and the calculated clock difference. The playback delay may then be used to initiate the streaming an audio stream component of the content extracted by A/V extractor 124 to client device 20. Because it is possible that the local clocks of client device 20 and content synchronization server 100 can begin to drift apart over time from the originally calculated clock difference, process 600 may be repeated periodically to ensure that the relevant content received at client device 20 remains synchronized. Once the relevant content is synchronized, it may be streamed to client device 20 using stream server 126. In some embodiments, client device 20 may be equipped with a user interface that permits manual adjustment of audio synchronization. The user interface may be in the form of one or more buttons or a slider, for example.

Transmission of audio data over a wireless (e.g., WiFi), cellular, or other non-point-to-point data connection, may be subject to sources of interference that can lead to data loss and reduction of audio quality. If the audio is played in real-time (i.e., as soon as the audio data arrives), the interference can lead to audio going out of sync or audio artifacts, such as clicks, for example, being audible. In highly synchronized applications with low tolerances for latency, such as synchronizing audio to a video running in real-time on a digital display, for example, interference may make it very difficult to keep the audio playing in time with the video. Two separate methods are disclosed to solve these problems.

Figure 8A:
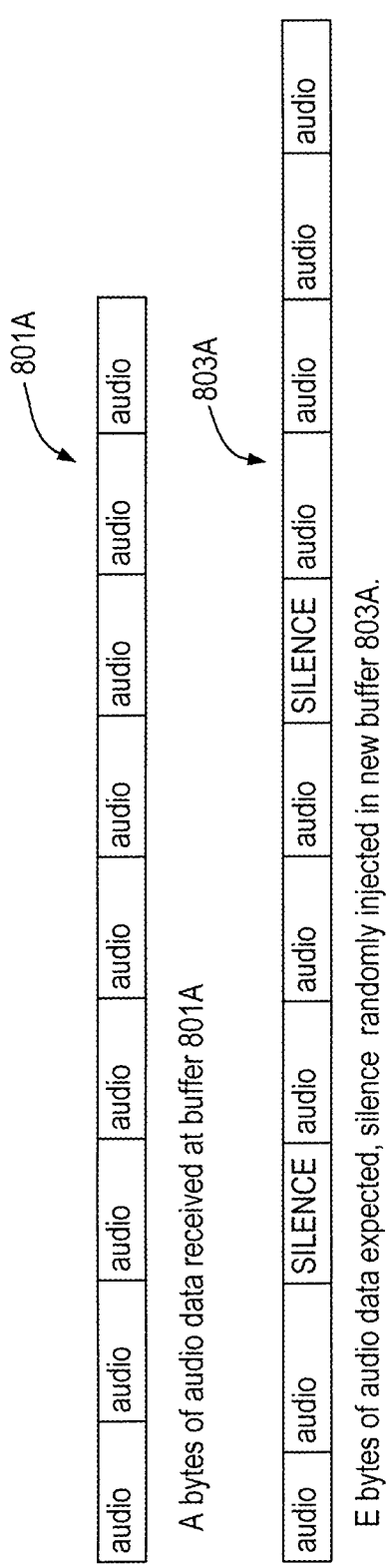
FIGS. 8A and 8B show data buffers, in accordance with various embodiments.
Figure 8B:
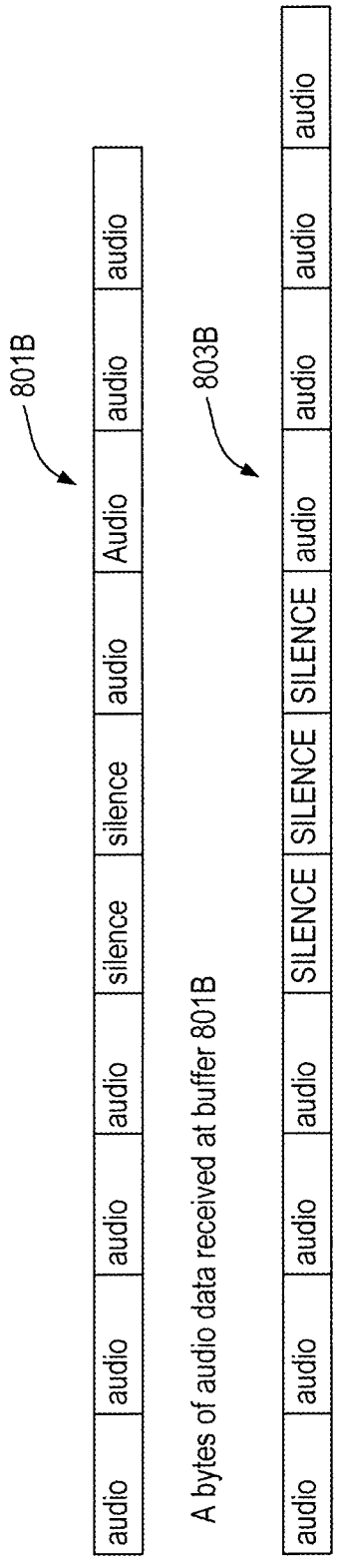

FIGS. 8A and 8B show buffers 801A and 803A, and 801B and 803B, respectively, in accordance with various embodiments. The first method uses random silence injection to compensate for lost audio data. In this embodiment, a client device (e.g., client device 20) may receive audio data for real-time playback and store the audio data in buffer 801A. If, at time T the client device expects to have E bytes of audio data in buffer 801 but actually only has A bytes of data (e.g., due to data transmission issues), the client device may randomly interject silence into the audio data stored in buffer 801A. Buffer 803A represents a buffer having the expected E bytes of audio data with bytes of silence randomly injected therein.

The second method uses silence extension to compensate for lost audio. In this method, the client device can analyze the audio data in buffer 801B to detect data fragments of silence. When such fragments are detected they may be extended to fill the buffer up to the expected size.

Figure 9:
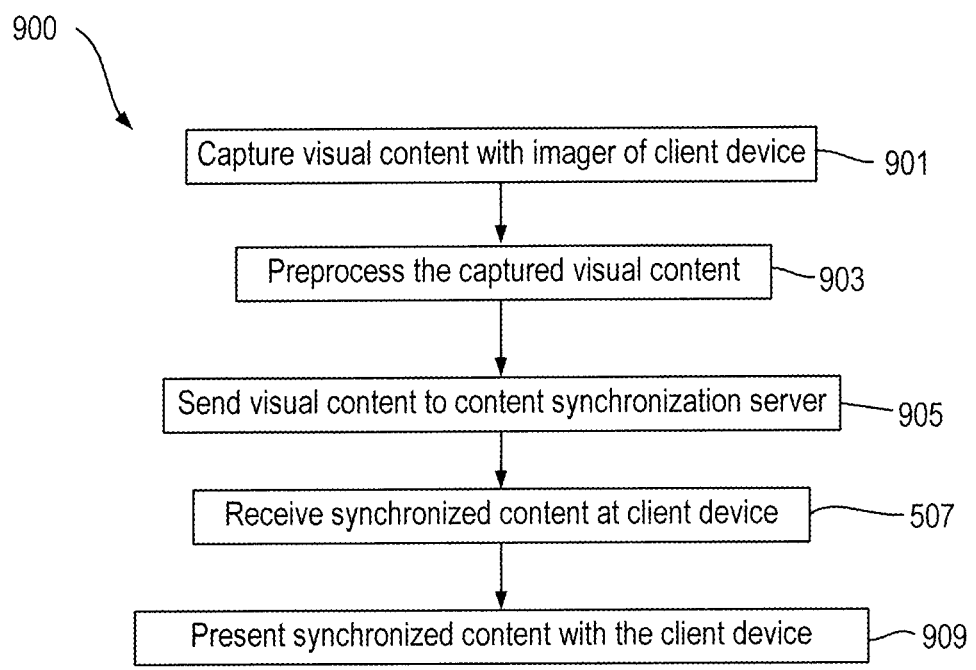
FIG. 9 shows a flowchart of an exemplary process for receiving synchronized content, in accordance with various embodiments.

FIG. 9 shows a flowchart of an exemplary process 900 for receiving synchronized content, in accordance with various embodiments. Process 900 may begin at step 901, in which a client device (e.g., client device 20 of FIG. 1) can capture visual content with an imager, such as a video camera, for example. The visual content may be any suitable visual content, such as the content of a digital display, a static image, or a live scene, for example.

At step 903, the client device may preprocess the captured visual content. Preprocessing the captured visual content may involve changing brightness levels or colors, cropping, or extracting key features, for example. Pre-processing the captured visual content may significantly reduce the computing resources required for a content synchronization server (e.g., content synchronization server 100 of FIG. 1) to identify the visual content.

At step 905, the client device may send the captured visual content to the content synchronization server. The content may be sent as a series of frames in the event that the captured visual content is a video. In some embodiments, the client device may send additional information, such as the client device's geolocation, one or more relevant timestamps, image properties, camera state, and/or user identifying information, for example.

At step 907, the client device may receive synchronized relevant content from the content synchronization server. The synchronized relevant content received may depend, for example, on the type of visual content captured and/or on the relevant content available on a third-party content source communicatively coupled to other components of the content synchronization server. In some embodiments, the synchronized relevant content may be an audio stream corresponding to video captured from a nearby digital display. In other embodiments, the synchronized relevant content may include "behind-the-scenes" content, exclusive interviews, quizzes, images, music videos, social media feeds discussing the captured visual content, user interfaces for voting on some aspect of the captured visual content, and/or advertisements, for example.

At step 909, the synchronized relevant content may be presented to the user. How the synchronized relevant content is presented may depend on the type of content received at step 907. For instance, if the synchronized relevant content is an audio stream corresponding to a video captured from a nearby digital display, the audio stream may be output using an audio output device of the client device, such as a speaker or an audio jack, for example. If the synchronized relevant content is additional visual content, however, that content may be presented on a display coupled to the client device, such as a connected monitor or a touchscreen display, for example.

Figure 10:
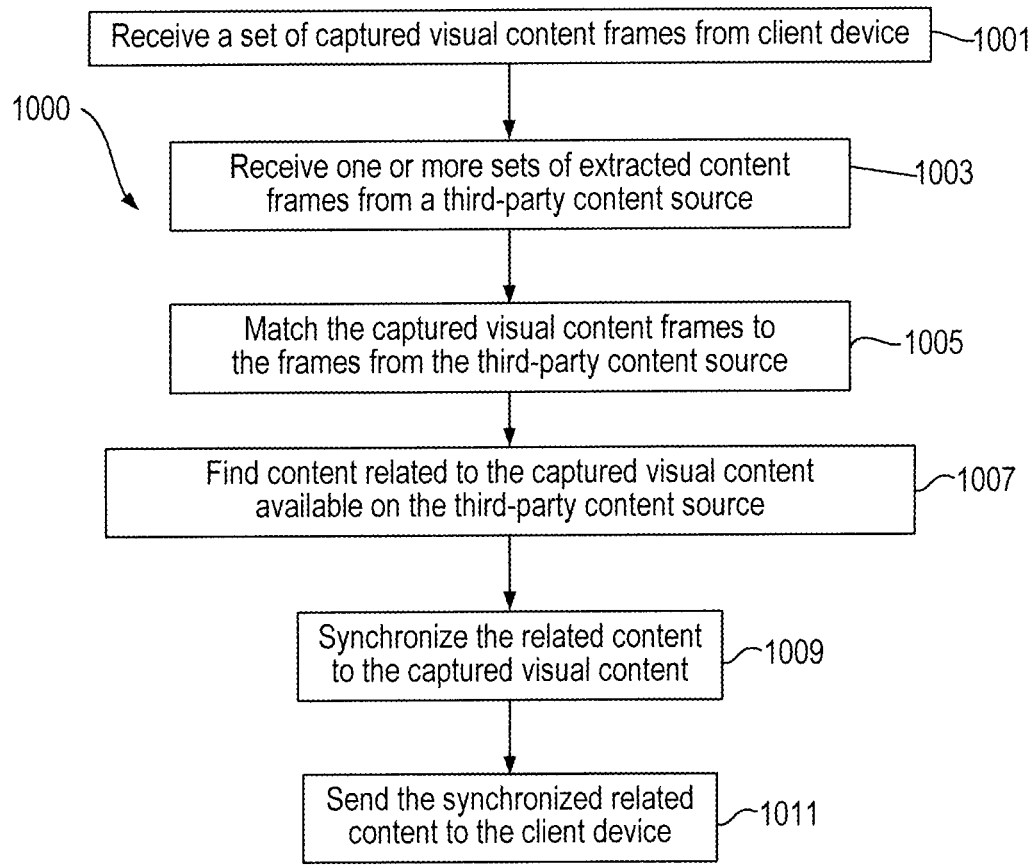
FIG. 10 shows a flowchart of an exemplary process for providing synchronized content, in accordance with various embodiments.

FIG. 10 shows a flowchart of an exemplary process 1000 for providing synchronized content, in accordance with various embodiments. Process 1000 may begin at step 1001, in which a content synchronization server (e.g., content synchronization server 100 of FIG. 2) can receive a set of captured visual content frames from a client device (e.g., client device 20 of FIG. 2). The captured visual content frames may represent a video captured using an imager of the client device as described above with respect to FIG. 8, for example.

At step 1003, the content synchronization server can receive one or more sets of extracted content frames from a third-party content source (e.g., third-party content source 122 of FIG. 2). The third-party content source may be a cable interface card capable of receiving a cable television signal or a database of on-demand content, for example. Frames of the content from the third-party content source may be extracted by an A/V extractor (e.g., A/V extractor 124) of the content synchronization system.

At step 1005, the content synchronization server can match the captured visual content frames to frames extracted from the third-party content source. The matching process may involve a number of steps, including detecting key frames from the extracted frames from the third-party content source, detecting the location of a digital display in the captured visual content frames, extracting features from all frames, eliminating channels or on-demand content items from consideration, and matching the remaining key frames to the captured visual content frames. The matching process may also include receiving and considering input from a prioritization engine (e.g., prioritization engine 170 of FIG. 2), which may prioritize certain channels or on-demand content items for matching over others based on data received from the client device and/or from a database of the content synchronization server (e.g., database 118 of FIG. 2). Still further, the matching process may include receiving and considering input from a calibration engine 172 (e.g., calibration engine 172 of FIG. 2), which may adjust certain thresholds that can define a match between the captured visual content and content from the third-party content source.

At step 1007, the content synchronization server can find content related to the captured visual content available on the third-party content source. The related content may be an audio stream corresponding to the captured visual content, which may be a separate component of the same content stream fed to the A/V extractor. In other embodiments, the related content may include "behind-the-scenes" content, exclusive interviews, quizzes, images, music videos, social media feeds discussing the captured visual content, user interfaces for voting on some aspect of the captured visual content, and/or advertisements, for example. These types of related content may be associated with the channel or on-demand content item identified in step 1005 such that upon receiving the indication, the related content may be retrieved and sent to the client device. The related content may be stored in a database with fields that cross reference the channel or on-demand content item as appropriate, for example.

At step 1009, a channel synchronization server (e.g., channel synchronization server 120 of FIG. 2) of the content synchronization server can synchronize the related content with the captured visual content. Synchronizing the related content may involve determining a difference in the local clocks between the client device and the content synchronization server, determining a lag between the captured visual content and content received from the third-party content source, and subtracting those two values to determine how much to delay playback of the relevant content. In some embodiments, the content synchronization server can periodically re-synchronize the relevant content to ensure that the relevant content remains synchronized with the captured visual content.

At step 1011, a stream server (e.g., stream sever 126 of FIG. 2) of the content synchronization server can send the synchronized relevant content to the client device. The stream server may stop sending the synchronized relevant content to the client device under any suitable circumstances, such as when the user leaves the vicinity of the digital display (e.g., as indicated by geolocation data received at the content synchronization server), after a predetermined time period (e.g., 30 min), upon indication from the client device of a desire to stop receiving the synchronized relevant content, and/or at a natural stopping point for the synchronized relevant content (e.g., the end of a television show).

Each functional component described above may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A computerized method for providing synchronized content, comprising:
    receiving imaged visual content at a content synchronization server from a client device communicatively coupled to the content synchronization server via a communication network, the imaged visual content is based on a visual representation of broadcasted visual content displayed on a screen of a third-party display, the visual content is imaged by at least one imager of the client device;
    receiving one or more sets of extracted content frames from a third-party content source communicatively coupled to the content synchronization server;
    matching content of the visual representation to content of the one or more sets of the extracted content frames for determining an audio content corresponding to the broadcasted content;
    performing a synchronization between the audio content and the broadcasted visual content that is presented on the third-party display; and
    streaming an audio stream generated according to an outcome of the synchronization to the client device.

2. The computerized method of claim 1, wherein the imaged visual content comprises: a set of video frames and local clock data from a local clock running on the client device.

3. The method of claim 2, wherein the synchronization is based on the local clock data, wherein the streaming comprises continuously or periodically comparing the local clock data to update the synchronization.

4. The computerized method of claim 1, comprising: finding additional content related to the imaged visual content available on the third-party content source, the additional content is selected from a group consisting of quizzes, social media feeds related to the imaged visual content, and user interfaces for capturing user input on some aspect of the imaged visual content, additional visual content, a stream of the broadcasted visual content, and an advertisement.

5. The computerized method of claim 1, further comprising:
synchronizing the additional content to the imaged visual content.

6. The computerized method of claim 5, wherein the synchronization comprises: determining a difference in local clocks of the client device and the content synchronization server;
determining a lag between the broadcasted visual content and the frames received from the third-party content source that match the broadcasted visual content;
subtracting the difference in the local clocks from the lag to determine how much to delay the audio stream.

7. The computerized method of claim further comprising:
periodically re-synchronizing the relevant content with the imaged visual content.

8. The computerized method of claim 1, wherein matching the broadcasted visual content to the frames extracted from the third-party content source comprises:
detecting key frames from the extracted frames from the third-party content source;
extracting salient features from the key frames and at least one imaged visual content frame from the imaged visual content;
eliminating a key frame of the key frames from consideration when the key frame does not include a salient feature from the at least one imaged visual content frame; and
eliminating at least one of channels and on-demand content items from consideration when all key frames associated with the at least one of channels and on-demand content items are eliminated.

9. The computerized method of claim 1, wherein matching the broadcasted visual content to the frames extracted from the third-party content source comprises:
detecting a location of a digital display in the imaged visual content frames.

10. The computerized method of claim 1, wherein matching the broadcasted visual content to the frames extracted from the third-party content source comprises:
receiving a list of at least one of channels and on-demand content items from a prioritization engine of the content synchronization server; and
attempting to mach frames extracted from the third-party content source extracted from channels or on-demand content items on the list before attempting to match frames extracted from the third-party content source extracted from channels or on-demand content items not on the list.

11. The computerized method of claim 10, comprising:
determining a confidence level metric for each channel and on-demand content item;
comparing the confidence level metric to a threshold minimum confidence level; and
declaring a match when the confidence level metric exceeds the threshold minimum confidence level.

12. The computerized method of claim 11, comprising:
receiving data from a calibration engine to lower the threshold minimum confidence level for channels and on-demand content items on the list.

13. A content synchronization system, comprising:
at least one server adapted for:
receiving: a plurality of imaged visual input frames imaged using at least one imager of a client device and includes a visual representation of broadcasted visual content displayed on a screen of a third-party display imaged in the imaged visual content, and a plurality of stored frames extracted from a visual content adapted to be broadcasted by a third party content source;
matching content of the visual representation to content of the plurality of stored frames for determining an audio content corresponding to the broadcasted visual content;
performing a synchronization between the audio content and the broadcasted visual content that is presented on the third-party display; and
streaming an audio stream generated according to an outcome of the synchronization to the client device.

14. The content synchronization server of claim 13, further comprising: an A/V extractor that extracts the stored frames from content received from a third-party content source.

15. The content synchronization server of claim 14, wherein the third-party content source comprises at least one of:
a cable interface card configured to receive a cable television signal; and
an on-demand content database.

16. The content synchronization server of claim 13, further comprising a database configured to store data received from the client device, the data comprising at least one of:
a geolocation of the client device,
timestamps corresponding to the imaged visual content frames, and
user-identifying information;
wherein said at least one server adapted for performing the matching based on the at least one of the geolocation of the client device, the timestamps corresponding to the imaged visual content frames, and the user-identifying information.

17. The content synchronization server of claim 13, wherein the channel synchronization server is configured to:
synchronize the imaged visual input frames with the set of frames extracted from a third party content source matched by the content detector module.

18. The content synchronization server of claim 13, further comprising:
a key frame detector that detects key frames from the frames extracted from a third party content source to reduce a number of frames to be processed and compared by the content detector module.

19. A computerized method for receiving synchronized content, comprising:
at a client device having an imager:
imaging visual content with an imager of a client device;
identifying, in the imaged visual content, a visual representation of broadcasted visual content displayed on a screen of a third-party display;
sending over a network at least part of the visual representation or an outcome of image processing the imaged visual content to a content synchronization server communicatively coupled to the client device;

receiving from the content synchronization server an audio stream determined based on a match between content of the visual representation and content of a third-party content source and synchronized with the broadcasted visual content presented on the third-party display at the client device; and presenting the audio stream using the client device.

20. The computerized method of claim 19, comprising:

preprocessing the imaged visual content at the client device before sending the at least part of the imaged visual content or the outcome of image processing the imaged visual content to the content synchronization server.

* * * * *